Feb. 4, 1969  B. R. WARD, JR  3,425,113
METHOD OF MAKING COMPOSITE SHEET STRUCTURES WITH
INTERNAL PASSAGES BY ROLL BONDING
Filed Sept. 21, 1966  Sheet 1 of 3

INVENTOR
BENNIE R. WARD, JR.

BY
Glenn, Palmer, Matthews & Lyne
ATTORNEYS

INVENTOR
BENNIE R. WARD, JR.
BY
Glenn, Palmer, Matthews & Lyne
ATTORNEYS

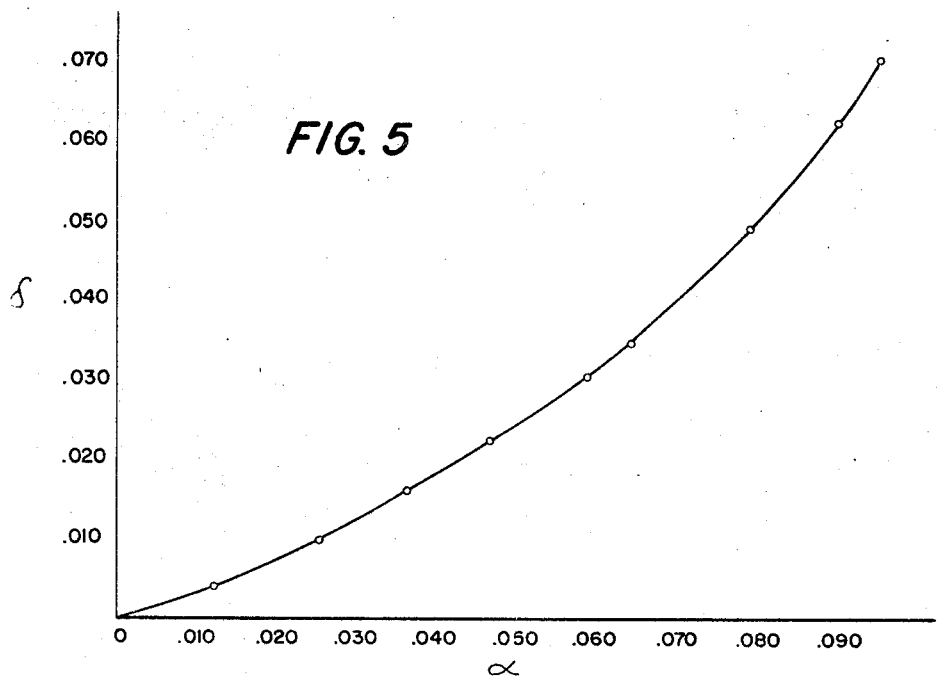
FIG. 5
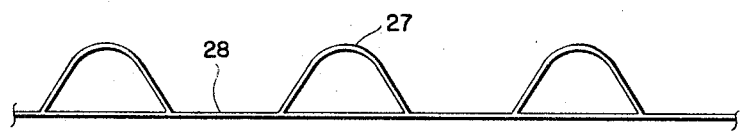
FIG. 6
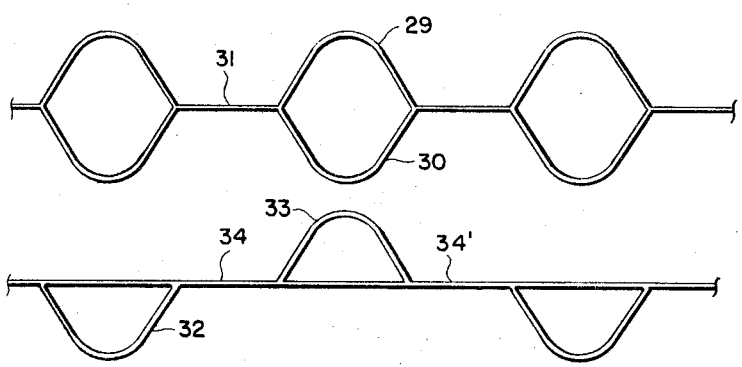
FIG. 7
FIG. 8
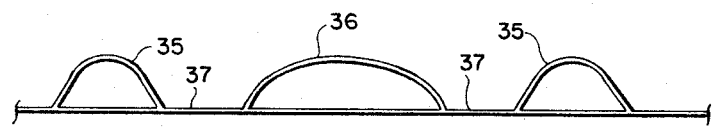
FIG. 9

United States Patent Office 3,425,113
Patented Feb. 4, 1969

3,425,113
METHOD OF MAKING COMPOSITE SHEET STRUCTURES WITH INTERNAL PASSAGES BY ROLL BONDING
Bennie R. Ward, Jr., Chesterfield County, Va., assignor to Reynolds Metals Company, Richmond, Va., a corporation of Delaware
Filed Sept. 21, 1966, Ser. No. 580,927
U.S. Cl. 29—157.3
Int. Cl. B21d 53/02; B21b 27/00; F28f 3/14
14 Claims This invention relates to a method of making thin-walled tubing and to an improved product having internal passages, and more particularly to a method in which sheets or strips of thin metal or the like, at least one of which is corrugated, are pressure welded or bonded together by rolling to reduce the thickness in the valleys or concavities of the corrugated sheet or sheets, thus leaving the peaks or convexities of the corrugated sheet or sheets standing proud as a series of parallel transverse tubes or tube-like passages connected by the bonded valleys or concavities. The composite sheets with internal passages thus formed are useful in heat exchangers such as automobile radiators, air conditioners, and the like, and are useful in general in any structure which calls for tubes, a composite sheet formed with internal passages, or a honeycomb structure, whether the tube-like passages are used as fluid flow passages or as strengthening and spacing members for the composite sheet.

There have been proposed in the art numerous methods of making products which are or can be, at least in general appearance and general configuration, similar to the products made by this invention. For instance, there is disclosed in U.S. Patent No. 3,123,905 a method of forming two corrugated sheets and connecting them by brazing, adhesive, or welding, into a honeycomb core having parallel transverse tubes. The brazing, however, as well as the adhesive, imposes a limit upon the range of successive high temperature operations to which the structure may be subjected, while the welded connections are probably either expensive or do not form fluid-tight barriers, and usually require separate operations. Alternatively, it has been proposed to make composite structures with internal passages by welding or otherwise connecting tubes along their lengths, or by forming opposed corrugated sheets around tubular molds or dies, followed by welding the corrugated sheets together, as disclosed in U.S. Patent No. 3,208,132. Such composite passaged structures have been proposed for use as the walls of rocket thrust chambers, for example. Finally, as disclosed in U.S. Patents No. 2,662,273 and 3,098,290, it has been proposed to make internal passages in sheet material by first coating one of two sheets with bond resistant material in a desired pattern, then bonding or welding the two sheets by rolling and reducing to effect, for instance, a 55% reduction in thickness and consequent bonding, and finally hydraulically expanding the unbonded pattern to form passages corresponding to that pattern.

With the foregoing in mind, my invention generally constitutes a method of making a generally improved product in a more efficient and economical manner, and the improved product thus made.

A primary object of my invention is to provide an improved method of connecting sheet material to form a sheet or honeycomb core with internal passages, at least one of the sheets being corrugated, and to provide an improved product so made.

It is another object of this invention to provide a continuous method of forming sheet with internal passages from corrugated sheet, or from flat sheet material by first corrugating at least one sheet, comprising bonding the corrugated sheet to another sheet by continuously rolling and reducing the concavities of the corrugated sheet with one or more ribbed rollers. While my invention does not necessarily preclude the use of sheets of a brazing alloy, a brazing alloy is unnecessary to effect a good bond between the sheets if a sufficient reduction in thickness is taken at the reduced and bonded areas.

It is a further object of this invention to provide a method of producing composite sheet or structure with internal passages by joining a corrugated sheet to another sheet, each of uniform thickness, in such a manner that the bonded metal thickness at the joined areas can be equal to or less than the individual thickness of either sheet, thus avoiding an undesirable double thickness, and hence excess metal, when the structure or sheet with internal passages is used in a heat exchanger.

It is a further object of the invention to provide a method of forming a composite sheet with internal passages by bonding a corrugated sheet and another sheet together by a pressure bond or rolled weld which is not adversely affected by subsequent high temperatures to which the sheet with internal passages may be subjected, such as in brazing operations in the assembly of radiators or heat exchangers and which may in fact be strengthened by such temperatures.

It is a further important object of this invention to provide a method of continuously pressure bonding together, by a ribbed roller and an opposed roller, the concavities of a corrugated sheet and the surface of a second sheet, which also may be corrugated, without crumpling or otherwise damaging the convexities of the corrugated sheet, even though the circumferential width of the ribs of the roller may be of greater extent than the width of the valleys or concavities measured transversely between adjacent convexities of the corrugated sheet, thus permitting by rolling bonding over the full width of the valleys between adjacent tube-like passages in the bonded sheet with internal passages. This is accomplished by establishing formulae or equations which define the maximum relative dimensions and configurations of the corrugated sheet and the ribbed roller, thus establishing fixed relationships which can be applied to determine the maximum dimensions of corrugated sheet for a given ribbed roller, or vice versa.

Basically the method of my invention involves bonding together two sheets at longitudinally spaced, transversely extending areas by passing them in facing relationship through two parallel cooperating bonding rollers, at least one of which is ribbed, the spacing between the ribs determining the lengths of the unbonded areas. At least one of the sheets is corrugated, i.e., has longitudinally spaced, transversely extending convexities or peaks separated by concavities or valleys, the convexities or peaks remaining unbonded so as to form tube-like passages in the bonded product. The two rollers are spaced apart so that the shortest distance between the peripheral surface of a rib on the ribbed roller and the cooperating surface of the other roller is less than the combined original thickness of the material of the two sheets, preferably by an amount such that the two sheets are bonded together by pressure bonding or welding or "cold welding" as they pass between the two rollers, these terms referring to the known process whereby metals can be joined or bonded by pressure alone with or without heating of the metals, apart from any brazed, welded or other type bond. The ribs of the ribbed roller are so spaced around the circumference of the roller as to engage only the concavities or valleys of the corrugated sheet, and their circumferential widths are determined by the desired lengths of the bonded areas, or vice versa.

Since the two sheets are reduced in thickness over the bonded areas, and since they have little tendency to spread in the lateral direction and are in any event restrained from doing so by the rollers, they undergo a corresponding increase in length in the direction of rolling over the bonded areas. So as to ensure that the engagement timing between the ribs of the roller and the concavities of the corrugated sheet remains constant, the increase in length or elongation must be compensated for in the spacing between the ribs of the rollers relative to the spacing between areas to be bonded on the corrugated shet. Thus the arcuate distance between the leading edges of successive ribs, relative to the spacing between the points on the unbonded sheets to be engaged by these leading edges, should be greater by an amount equal to the elongation created by one rib, which in turn depends upon the arcuate width of the rib and the amount of the reduction in thickness, and is equal to $$L_2 - \frac{L_2 T_2}{T_1}$$

where $L_2$ is the arcuate width of the rib, $T_2$ is the spacing between the roller surfaces, and also the final bonded thickness of the sheets, and $T_1$ is the original total thickness of the material of the two sheets.

Part or all of the concavity between adjacent convexities of the corrugated sheet may be reduced in thickness elongated and bonded by the ribs or the roller. Thus where the product is to be used in a radiator or heat exchanger, preferably the entire concavity should be reduced in thickness so as to avoid any double thickness in the bonded product. In such bonding, and in general in any bonding where the bonding is to extend to the edge of the leading profile of the oncoming convexity, there is a definite limit upon the shape of the profile if it is not to be crushed by the bonding rib, particularly the trailing edge of the bonding rib. Since the trailing edge of the bonding rib at the completion of bonding of the concavity will contact the corrugated sheet at the leading edge of the profile of the oncoming convexity, no point on the leading profile of the convexity should lie closer to the rib roller than a line traced by the trailing edge of the rib relative to the oncoming convexity during the rolling and bonding operation. The invention includes equations which determine this line, and hence which establish the limits to the profile of a convexity for any operating conditions. These equations will be set forth and explained subsequently.

In general, a ribbed roller of the smallest practical radius is much preferred in the practice of the invention because it permits more latitude in the shapes of the convexities. However, this is not essential to the invention in its basis aspects. The use of a small ribbed roller also avoids the simultaneous bonding of the sheets by successive ribs, thus avoiding problems that might be caused by two successive ribs tending to advance different parts of the material simultaneously at different speeds. For instance, if two successive ribs are bonding successive concavities at the same time, the leading rib will tend to move the intervening convexity at a relatively slower speed dependent upon the amount of reduction, whereas the trailing rib will tend to move the same intervening convexity at a relatively higher speed. In a particular operation this may be objectionable.

Preferably, although not essentially, the concavities to be bonded are formed reasonably flat during the forming of the corrugated sheet. However, the formation itself of the corrugated sheet is not a novel feature of the invention since it is well known in the art how to form corrugated sheet of substantially any desired configuration.

Other and further objects, features, and advantages of my invention will be apparent to those skilled in the art and armed with the basic concepts of my invention.

I have set forth with particularity and distinctness in the appended claims those novel features which I consider characteristic of my invention. The invention itself, however, both as to its operation and organization, together with additional objects and advantages thereof, will best be understood from the following description of preferred embodiments when considered in connection with the accompanying drawings, wherein:

FIGURE 5 is a graph on an enlarged scale showing the profile limiting curve for a particular exemplary set of operating conditions in accordance with the invention.

FIGURES 6–9 are profile illustrations, not to scale, of different general types and configurations of sheets with internal passages which can be made in accordance with the invention.

Figures 1, 2:
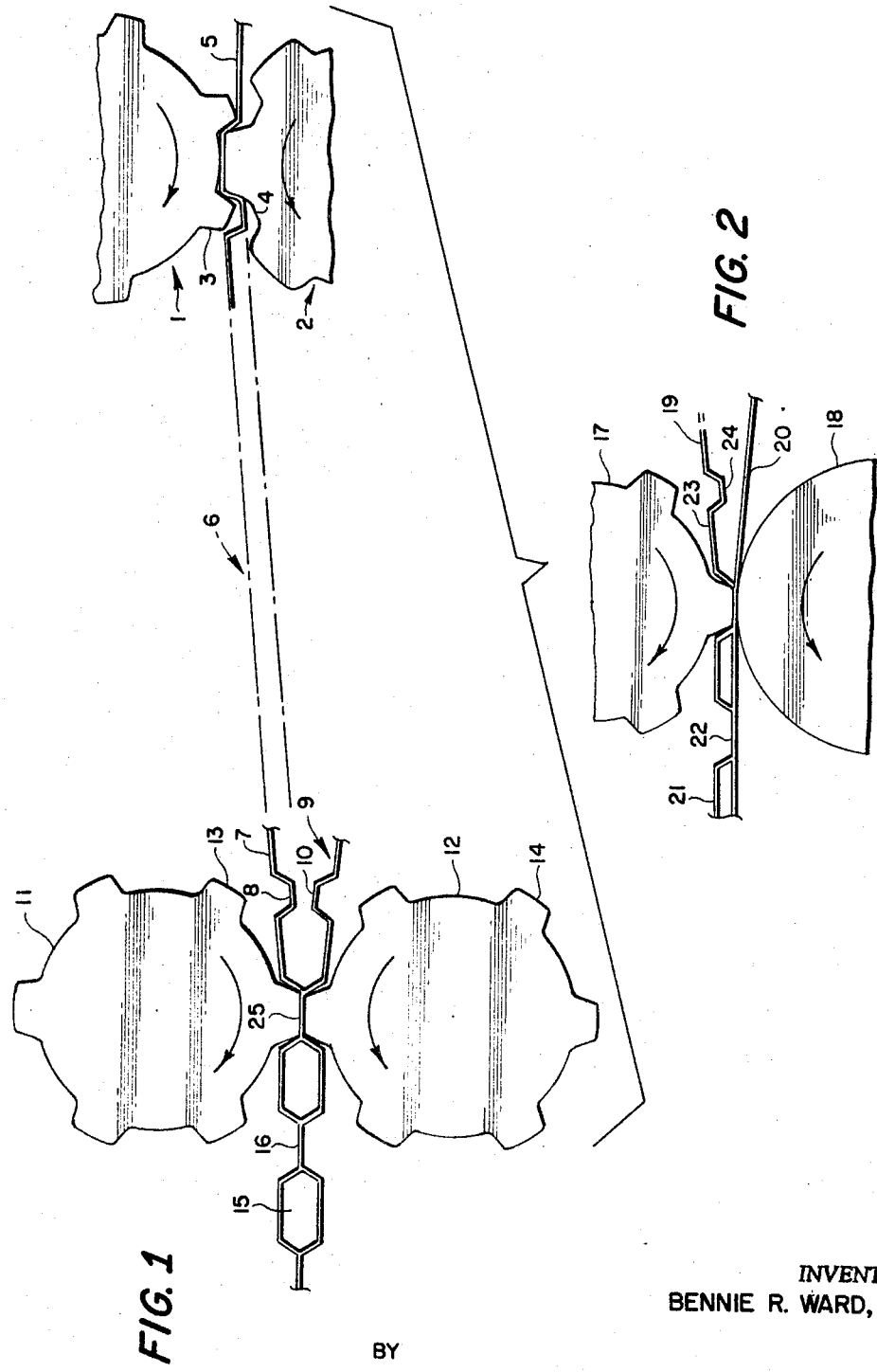
FIGURE 1 is a diagrammatic illustration of an embodiment of the invention whereby flat sheets are continuously corrugated and bonded together to form a composite sheet with internal passages, only one pair of the corrugated rollers being shown.
FIGURE 2 is an illustration corresponding to FIGURE 1 but showing the bonding operation of a preferred embodiment wherein a flat sheet and a corrugated sheet are bonded together to form a composite sheet or structure with internal passages.

Referring to the exemplary embodiment illustrated in FIGURE 1, two flat sheets 5 (only one of which is shown) of a suitable metal are passed between mating corrugated rollers 1 and 2 (only one set of rollers being shown in FIGURE 1) to corrugate the sheets by the intermeshing of the ribs of the respective rollers. Thus, as is well known in the art, ribs 3 of roller 1 enter valleys 4 of roller 2 to form a corrugated sheet 6 having alternate valleys or concavities 8 and peaks or convexities 7. The two corrugated sheets 6 and 9 are corrugated correspondingly, that is, so that the valleys or concavities 8 and 19 will abut each other when the corrugated sheets are brought together. The roll forming of corrugated sheets in this manner is well known in the art, and accordingly does not in itself constitute a novel feature of my invention. The profile of the corrugated material can be of substantially any desired shape, as is well known in the art, depending upon the desired shape of the tube-like passages of the finished product. However, in general I prefer that the corrugated sheets have flat valleys or concavities 8 and 10, and as will be discussed in detail subsequently, there are limitations on the profiles especially where it is desired to reduce and bond the valleys up to the immediate vicinity of the leading edges of the convexities.

After forming, the two corrugated sheets are brought together with valleys against valleys and peaks opposite peaks, and are passed between ribbed bonding rollers 11 and 12. The ribbed rollers are driven by any convenient drive arrangement so as to bring cooperating ribs successively into opposed relationship at the line connecting the centers of the two rollers. The spacing between opposed ribs at the line connecting the roller centers is less than the original thickness of the material of the two sheets, and the corrugated sheets are fed to the ribbed rollers so as to have the ribs engage the concavities. Since the clearance between the opposed ribs is less than the material thickness in the mating concavities 8 and 10 of the two sheets, the material in these concavities will be squeezed together and reduced in thickness as they pass between the opposed ribs of the two rollers. The reduced portions will be correspondingly increased in length in the direction of movemnet of the sheets, and will be bonded together if the reduction in thickness is of a sufficient extent. In the particular embodiment of FIGURE 1, the material of the two sheets is reduced in thickness by about 50%, and this is sufficient to effect a strong intimate bond in many metals. While the sheet material may be or include a brazing alloy, this is usually unnecessary if the reduction in thickness is sufficient for the particular metal or metals at their current temperatures. The pressure bonding is substantially facilitated if the sheets are wire brushed at the mating faces of the valleys and heated before entering the bonding rollers. While my invention in its broadest aspect does not preclude the use of a brazing alloy, this is not necessary to a good bond between the mating valleys.

It will be noted in FIGURE 1 that in the finished product the tube-like passages 15 are interconnected by valleys 16 which are substantially twice as long as the unbonded valleys 8 and 10, and substantially half as thick as the combined valleys 8 and 10. Since the entire width of each valley is bonded, the circumferential width of each rib 13 and 14 is twice the width of each valley 8 and 10, and the clearance between ribs is one-half the thickness of the valleys 8 and 10. The sheet material with internal passages is of substantially uniform thickness throughout, which makes it particularly valuable for use in radiators and other heat exchanges because there is no double thickness, and hence excess metal, at the bonded points. In use in radiators, the tube-like passages 15 would be fluid flow passages, and accordingly it is important that any wire brushing which is accomplished on the corrugated sheets before bonding should not extend over the portions which will form the inner walls of the tube-like passages, since the roughening of the walls would tend to inhibit the flow of fluid through the passages.

The pressure bonds between the tube-like passages are intimate and strong, much more so than in the case where corrugated sheets are merely brazed or connected together by adhesives and the like. The bond is not adversely affected by any subsequent high temperature operations to which the product may be subjected, such as in subsequent brazing during the formation of radiators and other heat exchangers. In fact the bond in most cases is strengthened by subsequent heating, and such heating can be accomplished as the final step in completing the product after bonding, if desired for a particular use.

The embodiment of FIGURE 1 forms a structure with internal passages in which the structure passages or tubes have outstanding profiles on both sides of the bonded connecting portions. In many cases it will be suitable to form such a composite sheet with one side substantially flat, the tube-like passages standing proud thereon, and for some uses such a construction is preferred. According to the embodiment of FIGURE 2, a corrugated sheet 19 is mated with a plain sheet 20 and passed through a rolling mill 17, 18 to effect bonding. The corrugated sheet, as in the embodiment of FIGURE 1, has it peaks or convexities 23 and valleys 24. In this embodiment only one roller need be ribbed, although two ribbed rollers can, of course, be used. As in the embodiment of FIGURE 1, the ribs of the ribbed roller engage successive concavities 24 of the corrugated sheet, and in cooperation with the plain roller 18 reduce the thickness of the two sheets and bond them together, while increasing the length oft he bonded portions. The lower surface of the plain sheet 20 remains substantially flat, and the corrugations stand proud from the composite structure as separated tube-like passages 21 sealed from each other by the bonded portions 22.

FIGURES 6–9 show exemplary different forms of composite structures or sheets with internal passages which structures may be formed in accordance with the invention. The sheet of FIGURE 6 is bonded in the manner illustrated in FIGURES 2, that is, by bonding a corrugated sheet to a flat sheet. The semi-eliptical passages are merely exemplary of a suitable form other than the substantially straight sided form of FIGURES 1 and 2. The connection portions 28 are, of course, the bonded connections between the valleys of the corrugated sheet and the surface of the plain sheet. In FIGURE 7 the passages 29 and connecting portions 31 are identical to the corresponding parts 27 and 28 of FIGURE 6, but FGURE 7 a second corrugated sheet is used so as to enlarge the passages by adding the additional convexities 30. In the embodiment of FIGURE 8, passages 32 and 33 alternate on opposite faces of the bonded product, and are spaced from each other along the sheet by successive bonded portions 34 and 34′. In making the product of FIGURE 8, two corrugated sheets are fed to a ribbed rolling mill with their peaks or convexities relatively offset, and the ribbed roller would engage and bond the valleys first at 34 and then at 34′, etc. The product of FIGURE 9 is identical to that of FIGURE 6 except that passages 35 alternate with passages 36 of a different size and configuration. The product is, of course, bonded at areas 37. The ribbed roller for making the product of FIGURE 9 would, of course, have successive ribs spaced apart by successive short and longer distances so as to allow for the different spacing between the concavities of the corrugated sheet.

Figure 3:
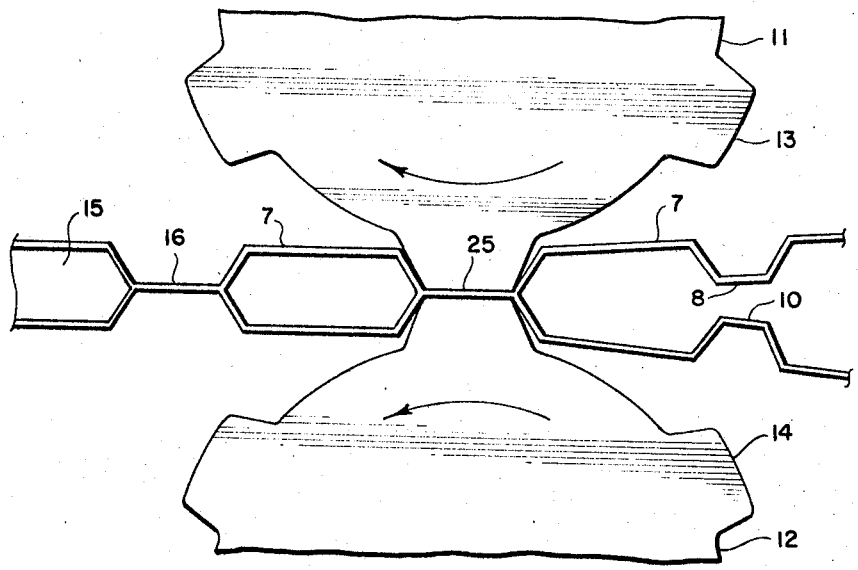
FIGURE 3 is an enlarged illustration of the left hand portion of FIGURE 1 showing the sheets passing between the ribs of the bonding rollers, and illustrating the relative dimensions and configurations of the bonded product relative to the unbonded sheets, although not shown to true scale.

As illustrated most clearly in FIGURE 3, the dimensions and configuration of a convexity 7 of the corrugated sheet are substantially unchanged as the sheet passes through the bonding point 25, but concavities 8 and 10 in passing through the bonded point become integrally bonded, substantially thinner, and substantially longer, as shown at 16. Because of the elongation of the bonded portions effected during the bonding operation, the pitch or spacing between corresponding points on successive tube-like passages on the bonded product is greater than the pitch or spacing between corresponding convexities on the corrugated sheet by a distance substantially equal to the elongation which is effected in the bonded concavities. This elongation is substantially equal to $$L_2 - \frac{L_2 T_2}{T_1}$$

where $L_2$ is the circumferential width of the bonding rib, that is, the arcuate distance between the leading and trailing edges of the rib which contact the concavity of the corrugated sheet, $T_1$ is the original total thickness of the material of the two sheets at the areas to be bonded, and $T_2$ is the final thickness of the bonded portions, which also is equal to the minimum spacing between the bonding surfaces of the two rollers. Therefore, in order to maintain the timing between the ribbed roller or rollers and the valleys and peaks of the corrugated sheet or sheets, the spacing between the leading edges of the ribs relative to the spacing between the points to be engaged by these leading edges in the valleys of the corrugated sheet or sheets should be greater by the amount of this elongation, or, otherwise stated, the spacing on the corrugated sheet or sheets should be less than the spacing of the leading edges of successive ribs by the amount of the elongation. This ensures that the ribs will contact and bond the sheets at the predetermined desired points in the valleys during continuous operation. Otherwise, the ribs would bond progressively different areas, and in time would engage the peaks rather than the valleys of the corrugated sheets.

While in accordance with my invention part or all of the width of each concavity of the corrugated sheet or sheets can be bonded, I prefer to reduce, lengthen and bond substantially the entire concavity between adjacent convexities, substantially as diagrammatically illustrated in FIGURES 1–3. To accomplish this it will be understood that the circumferential width $L_2$ of a rib must be greater than the width $L_1$ of the concavity which the rib is to bond by an amount which is proportional to the reduction in thickness at the bonded area. Expressed mathematically, $$L_1 = \frac{L_2 T_2}{T_1}$$

where $T_1$ and $T_2$ are the unbonded and bonded thickness, respectively. Since $T_2/T_1$ is always less than unity, $L_1$ is always less than $L_2$ when substantially the full width of the concavity is to be bonded. Thus for a bonded spacing $L_2$ between tubes in the finished product, and a reduction of 50%, the circumferential rib width will be $L_2$, and the unbonded concavity will be substantially one-half $L_2$ in width. If the ribbed roller and the unbonded sheets are properly timed initially, then the leading edge of each rib will engage a concavity or valley immediately adjacent the trailing edge of the preceding convexity, the concavity will be reduced, bonded and lengthened to $L_2$, and the trailing edge of each rib will engage the trailing edge of the concavity immediately adjacent the succeeding convexity. If a 50% reduction is taken over the full concavity, the bonded concavity will be doubled in width, and its thickness will be substantially equal to the wall thickness of the tubular passages.

Figure 4:
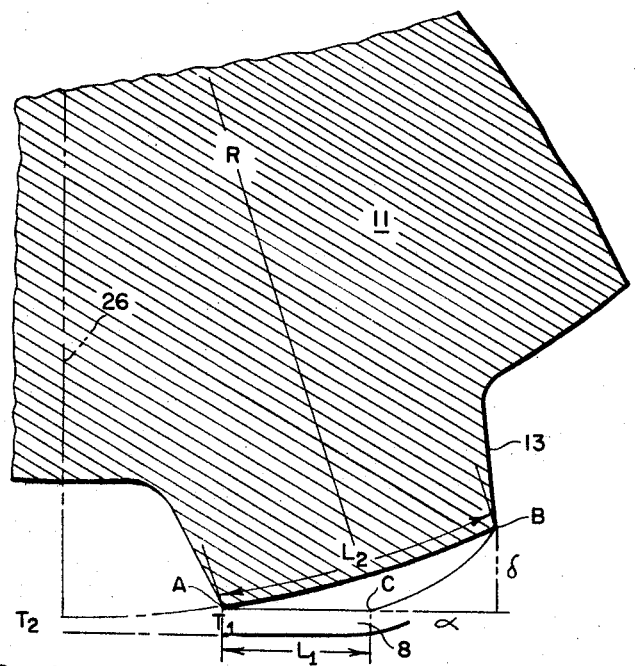
FIGURE 4 is a diagrammatic illustration of a bonding rib and a concavity of a corrugated sheet at the time when the leading edge of the rib makes initial contact with the concavity, showing also the general profile limiting path which the trailing edge will follow relative to the moving corrugated sheet during subsequent rolling, reducing and bonding.

The foregoing relationships between the roller ribs and the corrugated material are graphically illustrated in FIGURE 4, which shows a portion of a roller 11 having a rib 13, the line 26 representing the line between the center of that roller and its cooperating roller in the rolling and bonding mill. The leading edge of the rib 13 is shown as initially contacting the surface of a concavity 8 of a corrugated sheet at point A, the sheet at this point having a thickness $T_1$. The trailing edge of the rib is shown at B, and during subsequent roll bonding the concavity will be reduced to a thickness $T_2$ as it passes through line 26. Because of the reduction and elongation of that portion of the concavity which is engaged by the rib, the trailing edge B of the rib ultimately will engage the surface of the concavity at point C as the rib and the sheet material move progressively past the line 26. Accordingly, for a reduction of $T_2/T_1$ by a rib of width $L_2$, the distance between point A and point C on the concavity surface, indicated as $L_1$, is equal to $L_2 T_2/T_1$. Since the oncoming convexity must lie to the right of point C in order not to be crushed by the rib 13, the concavity must extend rearwardly from point A by a distance at least equal to $L_1$. This ensures that the rib 13 reduces and bonds the sheet material only in the concavity or valley and does not crush or bond any part of the oncoming convexity. Of course when it is desired to have the bond extend as close as possible to the oncoming convexity, the leading edge of the convexity should be located at point C or as close thereto as possible.

As will be clear from FIGURE 4, during the reduction and bonding of the concavity 8, the unbonded portion of the concavity will be moving in the feed direction at a slower speed than the rib and those portions of the sheet material that have already been bonded. This in inherent in the reducing and bonding process. In moving from the position shown in FIGURE 4 to ultimately contact point C, the trailing edge B of the rib will follow a path relative to the moving point C and the oncoming convexity, and any part of the leading profile of the oncoming convexity which lies to the left (as viewed in FIGURE 4) of this relative path will be crushed by the rib. This path is illustrated in FIGURE 4 as the line BC, and all points on the leading profile of the oncoming convexity must lies on or to the right of this line. It will be seen that the line essentially limits the taper of the leading profile of the oncoming convexity, and in general a reduction in the radius of the roller raises the permissible taper vertically as viewed in FIGURE 4.

The form of line BC is defined by a series of ordinates ($\delta$) and corresponding abscissae ($\alpha$), measured from point C as shown, and having corresponding values defined by the equations $$\delta = R + T_2 - T_1 - R \cos\left[\frac{L_{2'}}{R} + \cos^{-1}\frac{(R + T_2 - T_1)}{R}\right]$$

and $$\alpha = \left[\left(2R \sin \frac{L_{2'}}{2R}\right)^2 - \delta^2\right]^{1/2} - L_{1'}$$

where

R is the radius of the ribbed roller as shown in FIGURE 4;
$T_1$ and $T_2$ are the unbonded and bonded thicknesses, respectively, either of a single sheet or of the two sheets;
$L_{2'}$ is a variable of any selected value ranging between zero and $L_2$, and at any given time is the arcuate distance between the rearmost contact point of the rib with the surface of the concavity and the trailing edge of the rib;
$L_{1'}$ is equal to $T_2 L_{2'}/T_1$, and at any given time is the distance between the rearmost contact point of the rib with the surface of the concavity and the point C.

The coordinates conveniently can be calculated by assigning successive values to $L_{2'}$, solving for ($\delta$), computing $L_{1'}$ using the assigned value of $L_{2'}$, and solving for ($\alpha$) as the abscissae corresponding to the ordinate ($\delta$). FIGURE 5 shows the profile limiting curve for a roller of .750 inch radius having ribs of circumferential width .225 inch used in a bonding operation where $T_1$ and $T_2$ (single sheet thicknesses) were .020 inch and .010 inch, respectively.

These two equations and the equation $$L_1 = \frac{T_2 L_2}{T_1}$$

together in essence determine the permissible length and shape of each concavity and convexity in the corrugated sheet to be bonded, and are applicable to any situation where corrugated sheet material is to be bonded into tube sheet by rib rolling. They can be used to determine the form of the corrugated material required or permissible for a particular roller, or to determine a suitable roller for bonding a particular corrugated sheet. Thus for bonding by a ribbed roller of radius R and circumferential rib width $L_2$, and reducing the thickness by $T_2/T_1$, the corrugated sheet should have a concavity width $L_1$ of at least $T_2 L_2/T_1$, and the leading profile of the succeeding convexity should lie on, or away from the roller relative to, a curve leading from the trailing edge B of the rib and having coordinates ($\delta$) and ($\alpha$) as defined in the two equations. Of course the height of the concavities should be slightly less than the depth of the ribs so as to clear the ribbed roller when entering between successive ribs and passing between the bonding rollers. The spacing between corresponding points in successive concavities of the corrugated sheet should be less than the spacing between leading edges of successive ribs by a distance equal to the elongation which will result from the reduction, or $$L_2 - \frac{L_2 T_2}{T_1}$$

so as to ensure maintenance of proper timing between the ribbed roller or rollers and the corrugated sheet or sheets. Of course the equations can also be used to arrive at a suitable ribbed roller and an appropriate corrugated sheet for use in producing a particular bonded product. While the corrugated sheet can be of substantially any desired configuration within the foregoing limits, it is preferable that the concavities be flat-bottomed so as to avoid or minimize any possible slipping and subsequent misalignment which can occur in initially mating curved valleys against each other.

It will be noted that the rib 13 illustrated in FIGURE 4 is shown as having sharp leading and trailing edges A and B and as having the curvature of the rib surface extending along an arc generated by radius R from the center of the roller. In actual practice the rib usually is formed with slightly rounded leading and trailing edges, and the arc of the rib surface is generated from a point displaced somewhat toward the rib from the center of rotation. Usually such departures from the form illustrated in FIGURE 4 are not such as to substantially affect the applicability of the foregoing equations. In extreme situations where the departures are substantial, the thickness $T_2$ in the equations should be the mean value of the thickness in the bonded product, or the mean clearance between cooperating surfaces of the bonding rollers. The distance $L_2$ should be measured between those points on the rounded leading and trailing edges which first and last contact the concavity during bonding. The radius R should be taken as the radius measured from the center of rotation to the trailing edge of the rib. Also, when bonding corrugated sheet having valleys which are curved in cross section, the initial contact point A should be considered as the point engaged by the leading edge of the rib when the sheets have been moved into contact such that further movement of the rib necessarily will reduce the thickness of the material of the two sheets, or, otherwise stated, when the spacing between the leading edge of the rib and the corresponding point on the other roller is substantially equal to the total thickness of the material of the two sheets. Also in the case of curved concavities, the distance $L_1$ in the unbonded concavity should be considered as measured along the curvature of the concavity. Thus the equations are applicable to the bonding of S-shape corrugated sheet, although they are most accurate and most useful as applied to bonding of corrugated sheet with flat or substantially flat concavities.

The sheets can be of any suitable metal, such as aluminum, copper, steel, etc., or alloys of these, and the bonded sheets can be of respectively different metals.

As previously stated, in general a reduction of about 50% or more is necessary to effect a good bond for most metals, although the particular reduction depends upon the particular metal and its state at the time it passes through the rolling mill. Since pressure bonding or bonding by rolling of metals is in itself generally well known in the art, it is well within the skill of the art to determine the required reduction for particuar metals under particular conditions.

As an example of the practice of my invention, two sheets of 1235 aluminum .020 inch thick, one of which was corrugated, were brushed at the areas to be bonded and heated at 875° F. for five minutes. The pieces were mated and passed through a two-high, direct drive mill with the roll surface set .020 inch apart, one of the rolls being of 5-inch diameter with .400-inch ribs and .500-inch spacing between the ribs. Sound bonds were effected, whereas a roll spacing of .030 inch did not result in a good bond. The bonds were strengthened by subsequent heating at 875° F. for five minutes, followed by air cooling.

Other operations were performed following substantially the same procedure and operating conditions, but using a four-high mill with a 1½ inch diameter roll with six ribs .225 inch wide. The periphery of the work roll at each end was left unribbed so as to provide contact surfaces for a back-up and driving roll. As previously stated, a small radius roll, within practical limits, is preferred.

I have set forth in the foregoing description, taken in conjunction with the drawings, the best mode presently contemplated of carrying out my invention and have described completely embodiments of the method and of the manner of using it such that persons skilled in the art can practice my invention to the fullest extent. It should be understood, however, that the scope of the invention is as defined in the subjoined claims interpretated in the light of the foregoing description and illustrations.

What is claimed is:

1. A method of making thin-walled tube comprising bringing together in facing relationship a substantially transversely corrugated sheet and a second sheet so as to have concavities of the corrugated sheet contact the face of the other sheet, and passing the two sheets through a rolling mill comprising one substantially transversely ribbed roller and a second cooperating roller so as to have the ribbed roller engage the concavities of the corrugated sheet and the cooperating roller engage the second sheet, the two rollers being spaced apart such that the minimum spacing between the rib surfaces and the cooperating surface of the second roller is less than the original thickness of the material of the two sheets so as to reduce the thickness and bond the sheets together where they pass between a rib and the cooperating roller, and consequently increase the length of the sheet material at the reduced and bonded area, the ribs being circumferentially spaced so as to engage and bond only the concavities of the corrugated sheet whereby the convexities of the corrugated sheet will stand proud as tube-like passages separated by the bonded portions of the sheets.

2. A method as claimed in claim 1 wherein said second cooperating roller is ribbed correspondingly with said ribbed roller, and the two rollers are rotated in synchronism so as to have corresponding ribs pass at the same time through the line connecting the roller centers.

3. A method as claimed in claim 2 wherein said second sheet is also corrugated, and the sheets are brought together so as to have their respective concavities in contrast.

4. A method as claimed in claim 1 wherein the circumferential width of a rib of said ribbed roller is $L_2$, the combined thickness of the material of the two sheets before bonding is $T_1$, the minimum spacing between the rib surface and the surface of the cooperating roller is $T_2$, and the circumferential spacing between the leading edges of the rib and the adjacent following rib, relative to the spacing between the points on the unbonded sheet to be engaged by these leading edges, is greater by an amount equal to the elongation effected by said rib during bonding, said elongation being equal to $$L_2 - \frac{L_2 T_2}{T_1}$$

5. A method as claimed in claim 1 wherein the circumferential spacing between the leading edges of two successive ribs on said ribbed roller, relative to the spacing between the points on the unbonded sheet to be successively engaged by these two leading edges, is greater by an amount equal to the elongation effected by the leading one of these two ribs during bonding.

6. A method as claimed in claim 5 wherein said spaced points on the unbonded sheets are corresponding points in successive concavities separated by a convexity of said corrugated sheet.

7. A method as claimed in claim 1 wherein each concavity between successive convexities in the unbonded corrugated sheet is of a length, measured in the direction of movement, at least equal to $T_2 L_2/T_1$ where $T_2$ is the minimum spacing between the rib surface which engages the concavity and the surface of the cooperating roller, $T_1$ is the combined thickness of the material of the two sheets before bonding, and $L_2$ is the circumferential length of the rib which will engage and bond the concavity.

8. A method as claimed in claim 1 wherein the dimensions of the corrugated sheet are such that each concavity of the corrugated sheet before bonding extends rearwardly from the point of initial contact by the rib which engages the concavity a distance at least equal to $T_2 L_2/T_1$ where $T_2$ is the minimum spacing between the rib surface which engages the concavity and the surface of the cooperating roller, $T_1$ is the combined thickness of the material of the two sheets before bonding, and $L_2$ is the circumferential length of the rib which will engage and bond the concavity.

9. A method as claimed in claim 1 wherein all points on the leading profile of each convexity following a concavity of said corrugated sheet in its unbonded state lie on, or away from the ribbed roller relative to, a line extending from the concavity at a point located rearwardly from the point of initial contact by the rib which engages the concavity a distance equal to $T_2L_2/T_1$, said line being defined by ordinates ($\delta$) measured from said point transversely to the direction of movement of the sheet material and toward said ribbed roller and abscissae ($\alpha$) measured from said point oppositely to the direction of movement, and having respective values such that $$\delta = R + T_2 - T_1 - R \cos\left[\frac{L_{2'}}{R} + \cos^{-1}\left(\frac{R+T_2-T_1}{R}\right)\right]$$

and $$\alpha = \left[\left(2R \sin \frac{L_{2'}}{2R}\right)^2 - \delta^2\right]^{1/2} - L_{1'}$$

where

R is the radius of the ribbed roller;
$T_2$ is the minimum clearance between the cooperating surfaces of the two rollers;
$T_1$ is the original unbonded thickness of the material of the two sheets;
$L_2$ is the circumferential width of the rib which engages the preceding concavity;
$L_{2'}$ is a variable ranging between zero and $L_2$; and
$L_{1'}$ is equal to $T_2L_{2'}/T_1$.

10. A method as claimed in claim 9 wherein $L_2$ is greater than the length of the immediately adjacent preceding concavity measured in the direction of movement of the sheets.

11. A method as claimed in claim 10 further comprising the step of passing flat sheet material through a pair of mating ribbed corrugating rollers to form said corrugated sheet, the corrugating ribs which form the concavities of the corrugated sheet being of less circumferential width than the bonding ribs which engage the respective concavities.

12. A method as claimed in claim 1 wherein the minimum spacing between the rib surfaces and the cooperating surface of the second roller is not more than one-half the original total thickness of the material of the two sheets.

13. A method of making a metal sheet of parallel tube-like passages separated and sealed from each other by substantially flat connecting sheets which constitute bonded continuations of the metal of the upper and lower walls of the tube-like passages but are of thickness $T_2$ less than the total thickness $T_1$ of the material of the upper and lower walls, each connecting sheet having a width $L_2$ measured between adjacent tube-like passages, comprising the step of: feeding between the rolls of a rolling mill having at least one ribbed roller two metal sheets, at least one of which is corrugated, the minimum clearance between the rib surfaces and the cooperating surface of the other roller being equal to $T_2$, the ratio $T_2/T_1$ being sufficient to effect pressure bonding of the two sheets, the circumferential width of each rib being equal to $L_2$, the width of the concavities between convexities of the corrugated sheet being $$L_1 = \frac{L_2T_2}{T_1}$$

the spacing between corresponding points in successive concavities of the corrugated sheet relative to the spacing between corresponding points on successive connecting sheets of the finished product being less by an amount equal to $$L_2 - \frac{L_2T_2}{T_1}$$

the spacing between leading edges of the ribs of the ribbed roller being equal to the spacing between corresponding points on successive connecting sheets of the finished product, the sheets being fed to the rollers so as to have the ribs of the ribbed roller engage the concavities of the corrugated sheet.

14. A method as claimed in claim 13 wherein $T_1$ is at least twice $T_2$, and $L_2$ is at least twice $L_1$, and all points on the leading profile of each convexity of the corrugated sheet lie no closer to the ribbed roller than the path followed by the trailing edge of a rib relative to the movement of the corrugated sheet during the progressive engagement of that rib with the immediate preceding concavity.

References Cited

UNITED STATES PATENTS

| | | | |
|---|---|---|---|
| 2,554,185 | 5/1951 | Giegerich | 165—170 |
| 2,779,086 | 1/1957 | Rieppel et al. | 165—170 |
| 3,123,905 | 3/1964 | Thomas. | |
| 3,158,181 | 11/1964 | Gore. | |
| 3,194,308 | 7/1965 | Haried. | |

FOREIGN PATENTS 696,360   10/1964   Canada.

JOHN F. CAMPBELL, *Primary Examiner.*

PAUL M. COREN, *Assistant Examiner.*

U.S. Cl. X.R.

29—497.5, 472.3; 72—198; 165—170